United States Patent
Sudre et al.

(10) Patent No.: US 12,030,822 B2
(45) Date of Patent: Jul. 9, 2024

(54) ENVIRONMENTAL BARRIER COATING

(71) Applicant: Raytheon Technologies Corporation, Farmington, CT (US)

(72) Inventors: Olivier H. Sudre, Glastonbury, CT (US); Richard Wesley Jackson, Mystic, CT (US); Xuan Liu, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 823 days.

(21) Appl. No.: 16/859,827

(22) Filed: Apr. 27, 2020

(65) Prior Publication Data
US 2021/0331984 A1   Oct. 28, 2021

(51) Int. Cl.
*C04B 41/50*   (2006.01)
*C04B 41/00*   (2006.01)
(Continued)

(52) U.S. Cl.
CPC ........ *C04B 41/5057* (2013.01); *C04B 41/009* (2013.01); *C04B 41/4539* (2013.01);
(Continued)

(58) Field of Classification Search
CPC ............... Y10T 428/25; Y10T 428/252; Y10T 428/256; Y10T 428/258; Y10T 428/259; Y10T 428/249953; Y10T 428/249971; Y10T 428/249974; Y10T 428/249982; Y10T 428/249984; Y10T 428/249985; Y10T 428/249986; Y10T 428/249987; Y10T 428/249988; Y10T 428/24999; B32B 5/00; B32B 5/16; B32B 5/22; B32B 5/30; B32B 9/00; B32B 9/005; B32B 9/048; B32B 18/00; B32B 33/00; B32B 2255/00; B32B 2255/20; B32B 2255/28; B32B 2260/00; B32B 2260/02; B32B 2260/025; B32B 2260/04; B32B 2264/00; B32B 2264/10; B32B 2264/105;
(Continued)

(56) References Cited

U.S. PATENT DOCUMENTS 6,579,636 B2   6/2003   Oguri et al.
7,951,459 B2   5/2011   Tang et al.
(Continued)

FOREIGN PATENT DOCUMENTS

WO   2015042491   3/2015
WO   2015147960   10/2015

OTHER PUBLICATIONS

European Search Report for European Patent Application No. 21170196.6 dated Sep. 2, 20214.
(Continued)

*Primary Examiner* — Maria V Ewald
*Assistant Examiner* — Ethan A. Utt
(74) *Attorney, Agent, or Firm* — Carlson, Gaskey & Olds, P.C.

(57) ABSTRACT

An article includes a ceramic-based substrate and a barrier layer on the ceramic-based substrate. The barrier layer includes a matrix, diffusive particles, and gettering particles. The gettering particles include at least one of non-gas-evolving particles and porous particles. An article and a method are also disclosed.

20 Claims, 4 Drawing Sheets

(51) Int. Cl.
  C04B 41/45    (2006.01)
  C04B 41/52    (2006.01)
  C04B 41/87    (2006.01)
  C04B 41/89    (2006.01)
  F01D 5/28     (2006.01)
  F01D 25/00    (2006.01)

(52) U.S. Cl.
  CPC ...... *C04B 41/4582* (2013.01); *C04B 41/5024* (2013.01); *C04B 41/522* (2013.01); *C04B 41/87* (2013.01); *C04B 41/89* (2013.01); *F01D 5/284* (2013.01); *F01D 5/288* (2013.01); *F01D 25/005* (2013.01); *F05D 2240/11* (2013.01); *F05D 2240/35* (2013.01); *F05D 2240/55* (2013.01); *F05D 2300/222* (2013.01); *F05D 2300/2261* (2013.01); *Y10T 428/31504* (2015.04)

(58) Field of Classification Search
  CPC .... B32B 2264/1055; B32B 2264/1056; B32B 2265/1057; B32B 2264/1058; B32B 2264/107; B32B 2264/12; B32B 2264/20; B32B 2264/203; B32B 2264/2032; B32B 2264/303; B32B 2307/74; B23B 9/04; C04B 41/45; C04B 41/4582; C04B 41/50; C04B 41/5024; C04B 41/5025; C04B 41/5053; C04B 41/5057; C04B 41/5062; C04B 41/5071; C04B 41/52; C04B 41/526; C04B 41/80; C04B 41/81; C04B 41/85; C04B 41/87; C04B 41/89

USPC ....... 428/323, 325, 328, 331, 688, 689, 697, 428/698, 699, 701, 702, 304.4, 312.2, 428/312.8, 313.3, 313.9, 317.1, 317.7, 428/317.9, 318.4, 318.6, 319.1
See application file for complete search history.

(56) References Cited

U.S. PATENT DOCUMENTS

| | | | |
|---|---|---|---|
| 10,094,236 B2 | 10/2018 | Luthra | |
| 10,392,312 B2 | 8/2019 | Tang et al. | |
| 2016/0194762 A1* | 7/2016 | Schaedler | C22C 19/056 428/220 |
| 2016/0332922 A1* | 11/2016 | Tang | C23C 24/10 |
| 2017/0015600 A1 | 1/2017 | Schaedler | |
| 2017/0335118 A1* | 11/2017 | Tang | C09D 5/084 |
| 2018/0185876 A1* | 7/2018 | Walker | C23C 18/1635 |
| 2018/0222807 A1 | 8/2018 | Shim et al. | |
| 2020/0010375 A1 | 1/2020 | Tang et al. | |
| 2020/0062664 A1 | 2/2020 | Tang et al. | |

OTHER PUBLICATIONS

Carabat A.L. et al. "Protecting the MoSi2 healing particles for thermal barrier coatings using a sol-gel produced Al2O3 coating". Journal of the European Ceramic Society, vol. 38, No. 7. Feb. 8, 2018. pp 2728-2734.

* cited by examiner

ENVIRONMENTAL BARRIER COATING

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

This disclosure relates to composite articles, such as those used in gas turbine engines. Components, such as gas turbine engine components, may be subjected to high temperatures, corrosive and oxidative conditions, and elevated stress levels. In order to improve the thermal and/or oxidative stability, the component may include a protective barrier coating.

SUMMARY

An article according to an exemplary embodiment of this disclosure, among other possible things includes a ceramic-based substrate and a barrier layer on the ceramic-based substrate. The barrier layer includes a matrix, diffusive particles, and gettering particles. The gettering particles include at least one of non-gas-evolving particles and porous particles.

In a further example of the foregoing, the non-gas evolving particles, and porous particles, or sum of non-gas evolving particles, and porous particles comprise at least 30% of the gettering particles.

In a further example of any of the foregoing, the non-gas evolving particles include at least one of metallic particles, silicide particles, aluminide particles, boride particles, and a mixture thereof.

In a further example of any of the foregoing, the porous particles include a shell surrounding a hollow core.

In a further example of any of the foregoing, the shell comprises a silicon- or boron-containing material that is reactive with oxygen or water.

In a further example of any of the foregoing, the porous particles are an agglomerate of sub-particles.

In a further example of any of the foregoing, the sub-particles are hollow shells in a matrix.

In a further example of any of the foregoing, the porosity of the porous particles is between about 30-70%.

In a further example of any of the foregoing, the diffusive particles are barium-magnesium alumino-silicate particles.

In a further example of any of the foregoing, the gettering particles include silicon oxycarbide particles.

In a further example of any of the foregoing, the article includes a ceramic-based topcoat on the barrier layer.

In a further example of any of the foregoing, the article contains an intermediate layer between the barrier layer and the substrate. The intermediate layer contains gettering particles in a matrix.

In a further example of any of the foregoing, the non-gas-evolving particles have a protective coating. The protective coating is operable to limit reactivity of the porous particles.

In a further example of any of the foregoing, the article is an airfoil, combustor wall or blade outer seal for a gas turbine engine.

An article according to an exemplary embodiment of this disclosure, among other possible things includes a ceramic-based substrate. The article also includes a barrier layer on the ceramic-based substrate, the barrier layer including a matrix, barium-magnesium alumino-silicate particles, and gettering particles. The gettering particles include at least one of non-gas evolving particles and porous particles. The article also includes an intermediate layer between the barrier layer and the ceramic-based substrate, the intermediate layer including gettering particles in a matrix; and a ceramic-based topcoat in the barrier layer.

In a further example of the foregoing, the non-gas evolving particles or porous particles comprise at least 30% of the gettering particles in the barrier layer.

In a further example of any of the foregoing, the non-gas evolving particles include at least one of metallic particles, silicide particles, aluminide particles, boride particles, and a mixture thereof.

In a further example of any of the foregoing, the porous particles include a shell surrounding a hollow core.

In a further example of any of the foregoing, the porous particles are an agglomerate of hollow sub-particles in a matrix.

A method according to an exemplary embodiment of this disclosure, among other possible things includes applying a slurry containing diffusive particles, gettering particles, and matrix material in a carrier fluid to a substrate. The gettering particles include at least one of non-gas-evolving particles and porous particles. The method also includes sintering the slurry to form a barrier layer.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
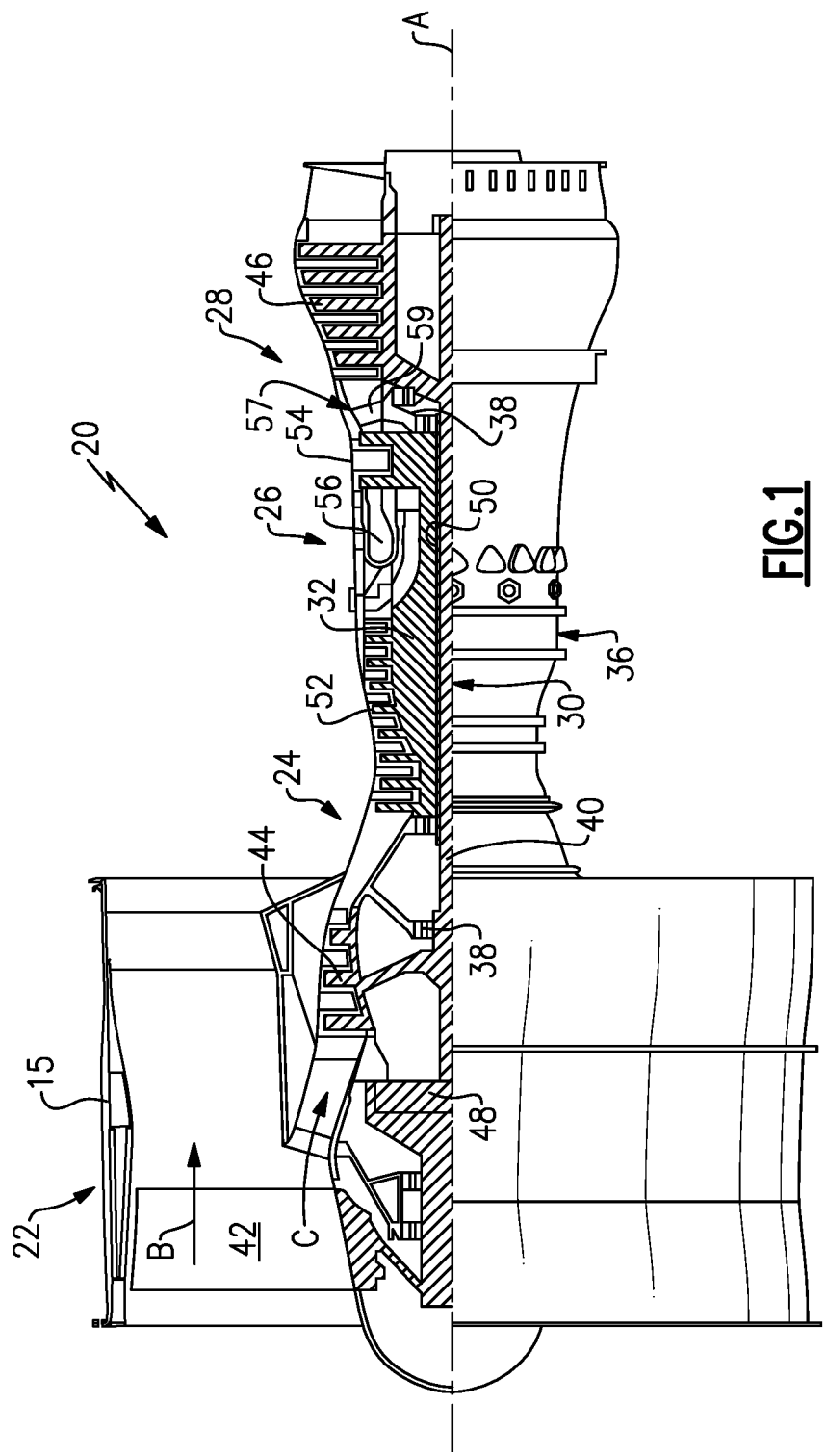
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans. A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 meters/second).

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotors. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors in the low pressure turbine 46 and the number of blades 42 in the fan section 22 disclose an example gas turbine engine 20 with increased power transfer efficiency.

Figure 2:
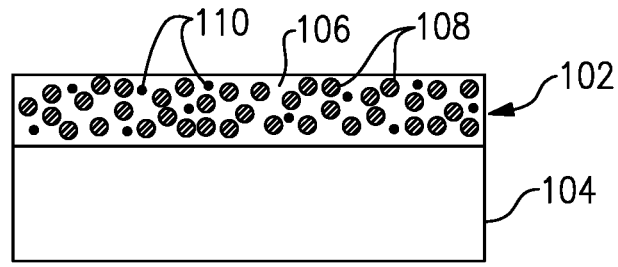
FIG. 2 illustrates an example article having a barrier layer of a composite material that includes barium-magnesium alumino-silicate particles.

FIG. 2 schematically illustrates a representative portion of an example article 100 for the gas turbine engine 20 that includes a composite material 102 that is used as a barrier layer. The article 100 can be, for example, an airfoil in the compressor section 24 or turbine section 28, a combustor liner panel in the combustor section 26, a blade outer air seal, or other component that would benefit from the examples herein. In this example, the composite material 102 is used as an environmental barrier layer to protect an underlying substrate 104 from environmental conditions, as well as thermal conditions. As will be appreciated, the composite material 102 can be used as a stand-alone barrier layer, as an outermost/top coat with additional underlying layers, or in combination with other coating under- or over-layers, such as, but not limited to, ceramic-based topcoats.

The composite material 102 includes a matrix 106, a dispersion of "gettering" particles 108, and a dispersion of "diffusive" particles 110. The matrix 106 can be, in one example, silicon dioxide ($SiO_2$). Other possible matrices 106 include other silicates such as silicate glasses, partially crystalline glasses or crystalline silicates such as rare earth silicates. The barrier layer formed of the composite material 102 protects the underlying substrate 104 from oxygen and moisture. For example, the substrate 104 can be a ceramic-based substrate, such as a silicon-containing ceramic material. One example is silicon carbide. The gettering particles 108 and the diffusive particles 110 of the barrier layer function as an oxygen and moisture diffusion barrier to limit the exposure of the underlying substrate 104 to oxygen and/or moisture from the surrounding environment. The gettering particles 108 are reactive with respect to oxidants and/or water and mitigate oxidants and/or water from diffusing through the barrier layer. Without being bound by any particular theory, the diffusive particles 110 enhance oxidation and moisture protection by diffusing to the outer surface of the barrier layer opposite of the substrate 104 and forming a sealing layer that seals the underlying substrate 104 from oxygen/moisture exposure. Further, the diffusion behavior of the diffusive particles 110 may operate to seal any microcracks that could form in the barrier layer. Sealing the micro-cracks could prevent oxygen from infiltrating the barrier layer, which further enhances the oxidation resistance of the barrier layer. One example diffusive particle 110 is barium-magnesium alumino-silicate particles ("BMAS particles 110"), though other examples are contemplated.

Figure 3:
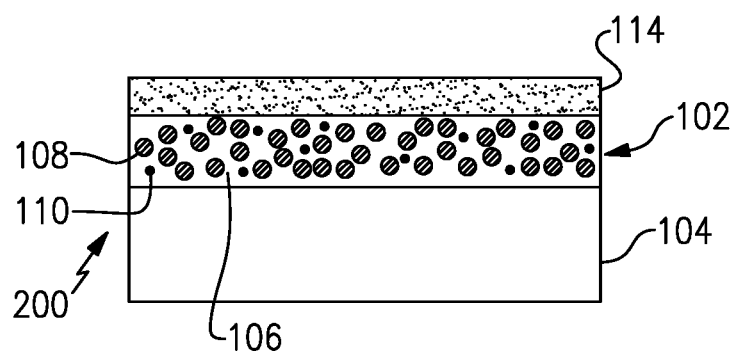
FIG. 3 illustrates another example article having a barrier layer of a composite material that includes barium-magnesium alumino-silicate particles.

FIG. 3 shows another example article 200 that includes the composite material 102 as a barrier layer arranged on the substrate 104. In this example, the article 200 additionally includes a ceramic-based top coat 114 interfaced with the barrier layer. As an example, the ceramic-based top coat 114 can include one or more layers of an oxide-based material. The oxide-based material can be, for instance, hafnium-based oxides, yttrium-based oxides (such as hafnia, hafnium silicate, yttrium silicate, yttria stabilized zirconia or gadolinia stabilized zirconia), or combinations thereof, but is not limited to such oxides.

Figure 4:
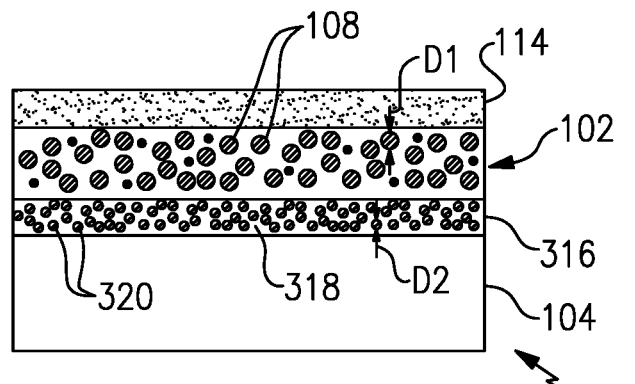
FIG. 4 illustrates another example article having a barrier layer of a composite material that includes barium-magnesium alumino-silicate particles.

FIG. 4 illustrates another example article 300 that is somewhat similar to the article 200 shown in FIG. 3 but includes a distinct intermediate layer 316 interposed between the barrier layer of the composite material 102 and the substrate 104. In this example, the distinct intermediate layer 316 includes an intermediate layer matrix 318 of silicon dioxide and a dispersion of intermediate layer gettering particles 320 in the intermediate layer matrix 318. The intermediate layer gettering particles 320 are similar to the gettering particles 108 in composition but, in this example, the intermediate layer gettering particles 320 have an average maximum dimension (D2) that is less than the average maximum dimension (D1) of the gettering particles 108. The relatively small intermediate layer gettering particles 320 provide a relatively low roughness for enhanced bonding with the underlying substrate 104. The larger gettering particles 108 of the barrier layer provide enhanced blocking of oxygen/moisture diffusion. Thus, in combination, the barrier layer and intermediate layer 316 provide good adhesion and good oxidation/moisture resistance. In one further example, D1 is 44-75 micrometers and D2 is 1-44 micrometers.

In one example, the intermediate layer 316 can include, by volume, 5-40% of the intermediate layer matrix 318 of silicon dioxide and a balance of the intermediate layer gettering particles 320. In further examples, a portion of the diffusive particles 110 from the barrier layer can penetrate or diffuse into the intermediate layer 316, during processing, during operation at high temperatures, or both. In a further example, a seal coat layer of $SiO_2$, with or without diffusive particles, can be provided between the barrier layer and the intermediate layer 316 to provide adhesion and additional sealing. In further examples of any of the compositions disclosed herein, said compositions can include only the listed constituents. Additionally, in any of the examples disclosed herein, the matrix 106 and 318 can be continuous.

The two-layer structure can is expected to demonstrate good oxidation protection at 2000-2700° F. for 500 hours or longer as well as good adhesion with the ceramic-based top coat 114.

The gettering particles 108/320 are reactive with respect to oxidant particles and/or water, which could diffuse into the barrier layer. In this way, the gettering particles 108/320 could reduce the likelihood of those oxidant particles/water from reaching and oxidizing the substrate 104. The gettering particles 108/320 have a diameter between about 1 and 75 microns. The gettering particles 108/320 can include a mixture of one or more types of particles. One example particle is silicon oxycarbide particles.

Some example particles 108/320 are porous. In some examples, the porous particles described herein have a "closed" porosity, meaning pores therein are substantially fully encapsulated by surrounding structures. Therefore, the pores will be substantially free from matrix material, as will be discussed in more detail below.

Figure 5A:
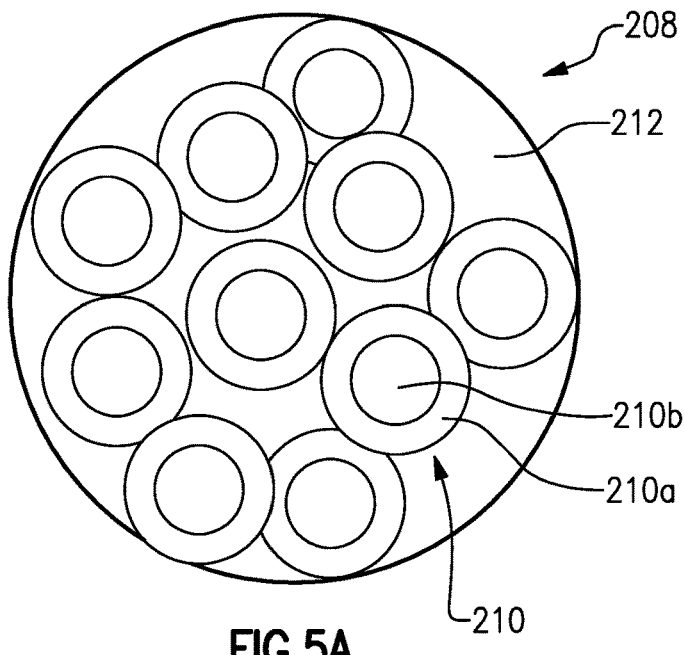
FIGS. 5A-C illustrate example porous gettering particles for the barrier layers of FIGS. 2-4.
Figure 5B:
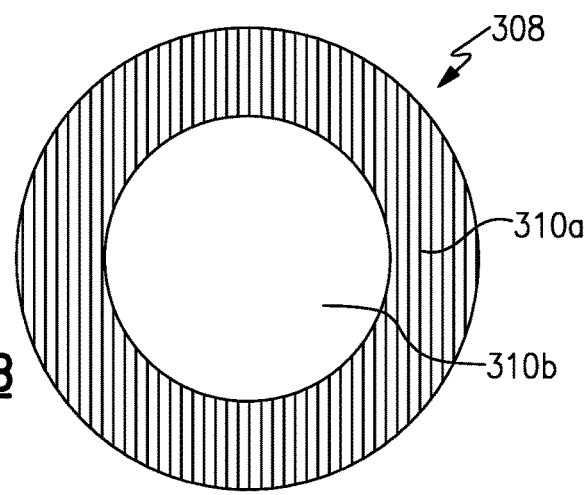
Figure 5C:
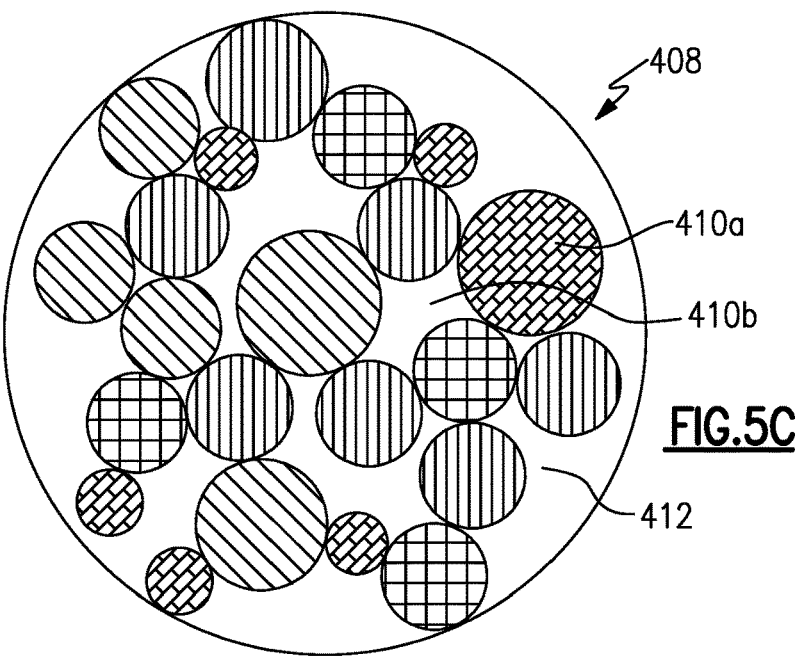

FIG. 5A-C show example porous particles 208/308/408. A particular example porous particle 208 is shown in FIG. 5A. The example particle 208 is an agglomerate of a plurality of sub-particles 210 in a matrix 212. The hollow shells 210 each include a shell 210*a* and a hollow center 210*b*. Another particular example porous particle 310 is shown in FIG. 5B. In this example, the porous particle 310 comprises a single hollow shell 310*a* similar to the shells 210*a* and a hollow center 310*b*. Another particular example porous particle 408 is shown in FIG. 5C. In this example, the particle 408 is an agglomerate of sintered or partially sintered sub-particles 410 with empty space 410*b* between the particles. In some embodiments, a matrix 412 can encapsulate the particles 410 but leave 410*b* empty. The sub-particles 210/410 can be partially sintered to one another to form the agglomerate particle 208/408.

Though the sub-particles 210/410 and particle 308 are shown as being generally round/spherical in FIGS. 5A-C, in other examples, they can have other shapes such as angular or elongated shapes. Furthermore, the sub-particles 210/410 can be similar in size (as in the example of FIG. 5A) or varying in size (as in the example of FIG. 5C). The porous particles 208/408 can be formed by any agglomeration technique of solid particles known in the art of powder metallurgy and/or ceramic fabrication. For example, the sub-particles 210/410 can be packed and sintered partially and the resulting compact crushed to form aggregates of particles. The particles 208/408 can also be created by agglomeration techniques using polymeric binders and then heat treated in a fluidized bed. Additionally, matrix material 212/412 can be added during the preparation of the particles 208/408 at any stage of the fabrication process.

The example particles 208/308/408 are reactive with oxygen, and can include materials such as SiC, SiOC, $MoSi_2$, $HfSi_2$, $ZrSi_2$, CrSi, $VSi_2$, $TaSi_2$, $YSi_2$, $WSi_2$, $NbSi_2$, $Mo_5Si_3$, $VSi_2$, $FeSi_2$, $CrSi_2$ or other similar silicides with varying stoichiometries; metals such as Zr, Hf, Ta, Fe, Ni, Co, Y, Ti, Ru; aluminides such as NiAl, $NbAl_3$, FeAl; other rare earth metal silicides, rare earth metal borides, refractory intermetallics or combinations thereof. In some examples, the oxidation products of the material of the example particles 208/308/408 have beneficial properties, such as gettering properties similar to those of gettering particles 108/320 and/or the diffusive properties similar to those of diffusive particles 110.

The matrix 212/412 can be the same as the matrix 106 of the composite material 102, or can be another suitable matrix material such as silicate glass, glass-ceramics or crystalline materials, rare earth mono or disilicates, or hafnium and zirconium silicates. The matrix 212/412 could be infiltrated into the particles 208/408 prior to incorporation of the particles 208/408 into the barrier layer. In another example, the matrix 212/214 could be infiltrated into the particles 208/408 during formation of the barrier layer. Formation of the barrier layer is discussed in more detail below. In some examples, the matrix 106/212/412 can control and/or slow down the oxidation of the material of the shells 210a/310a during the preparation of the barrier layer or inside the barrier layer during operation. In some other examples, the porous particles 208/308/408 and/or sub-particles 210/410 have a thin protective coating which is operable to limit their reactivity during processing or inside the barrier layer upon operation.

In composite materials 102 using solid (e.g., non porous) gettering particles of 108/320, the reaction of the solids particles with oxidants (e.g., oxidation) can cause volume changes as the oxidation products of a material can have higher volumes than the original ("parent") material. This volume increase could cause macroscopic disruptions in the barrier layer. In some examples, the barrier layer can experience a temperature gradient along the surface of the article 100, resulting in non-uniform volume expansion of the barrier layer, which could also contribute to disruptions of the barrier layer. In such cases, the porosity of porous particles 208/308/408 can compensate for volume increases upon oxidation by providing empty volume into which the material can grow. Furthermore, the matrix 212/412/106 surrounding the shells 210a/310a and/or the partially densified sub-particles 410 exerts a displacement constraint on the particles 208/308/408 and may promote densification towards the core as material from the hard shells 210a/310a and/or partially densified sub-particles 410 is spent by oxidation. In this way, volume changes of the particles 208/308/408 can be mitigated.

Figure 6:
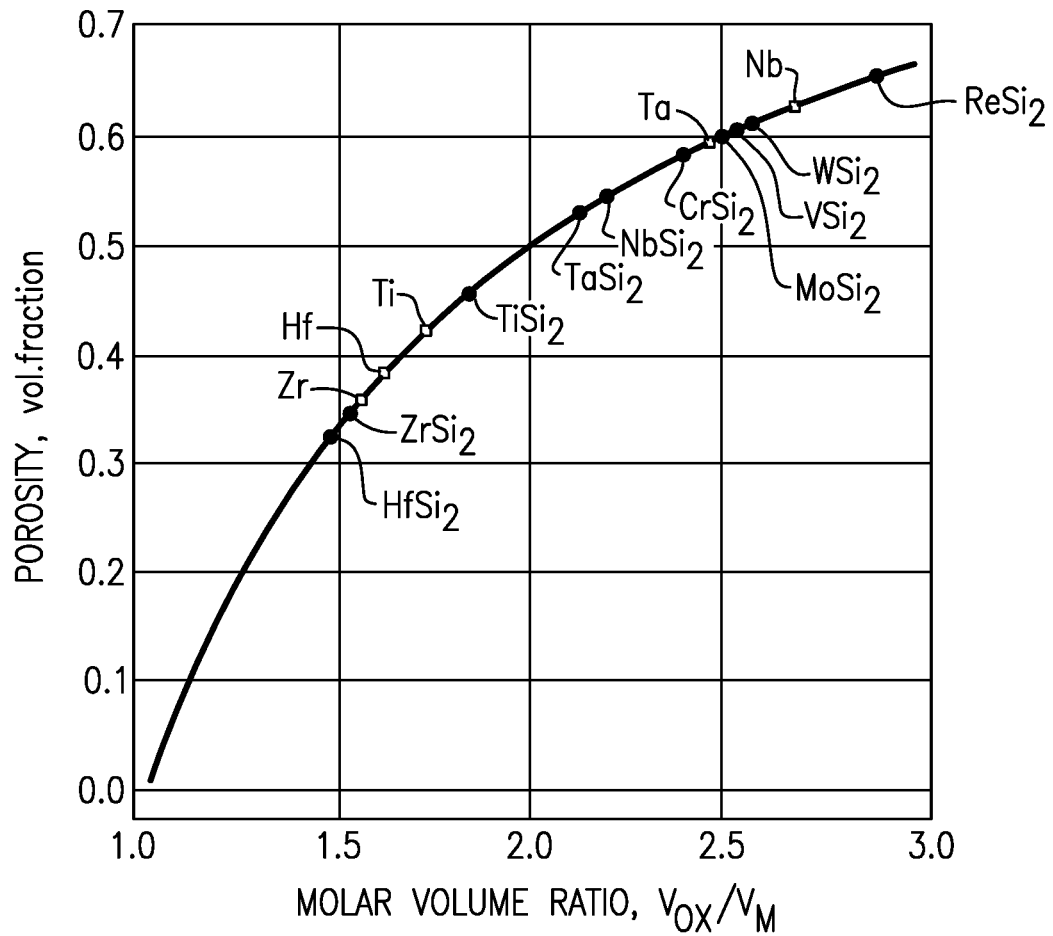
FIG. 6 illustrates the relationship between molar volume ratio and porosity for several materials.

The example porous particle 208/308/408 can have a porosity that is between about 0.3-0.7, where the porosity is defined as the fraction by volume of each particle 208/308/408 that is empty. For example, empty volume in particles 208/308 includes the hollow centers 208b/308b. Empty volume in particles 408 is the space 410b. The porosity can compensate for the volume expansion of the particle 208/308/408 upon its reaction with oxidative compounds such as oxygen or water as discussed above. The volume expansion of the solid materials in particles 208/308/408 can be estimated based on the molar volume of the initial material ($V_M$) and the volume of the final oxide formed ($V_{OX}$). FIG. 6 shows the relationship of the molar volume ratio ($V_{OX}/V_M$) to porosity for some example materials such that upon oxidation the volume expansion is exactly compensated by the porosity. The porosity of the particles 208/308/408 could be similar to the porosities shown in FIG. 6 for a given material, e.g., +/−10% of the porosity shown in FIG. 6 in some examples. A slightly lower porosity, e.g., between about 0-10% less, than that shown in FIG. 6 could induce compression in the barrier layer upon oxidation of the particles 208/308/408, which in turn could assist in closing cracks in the barrier layer.

Porous particles 208/308/408 may also improve the thermally insulating properties of the barrier layer 102. As known in the art, porous materials generally have good thermal insulation properties.

In other cases, volume expansion can occur where the oxidation products of a material in gettering particles 108/320 include gases such as carbon dioxide or carbon monoxide. Gasses can build up over time as the gettering particles 108/320/208/308/408 react with oxidant particles, causing mechanical disruptions of the barrier layer as discussed above. In other examples, the gasses can be trapped in the barrier layer by the ceramic-based top coat 114, which can mechanically disrupt the ceramic-based top coat 114 by causing bubbling of the ceramic-based top coat 114. This in turn could interfere with the effectiveness of the ceramic-based top coat 114 and/or bonding of the ceramic-based top coat 114 to the barrier layer.

Alternatively or additionally to the inclusion of porous particles 208/308/408, some of the gettering particles 108/320 could be non-gas-evolving particles, such as silicide particles, boride particles, metallic particles, aluminide particles, or combinations thereof. Specific example non-gas-evolving particles are $MoSi_2$ particles and $WSi_2$ particles. Non-gas-evolving particles are those that do not evolve gases such as carbon monoxide or carbon dioxide upon oxidation. The non-gas-evolving particles in some examples could have a protective coating which is operable to limit their reactivity during processing or inside the barrier layer upon operation of the engine 20. In one specific example, the thin protective coating could be a $SiO_2$ coating. The coating could be formed from natural oxidation of material. For instance, the coating could be formed by an oxidation heat treatment, though other techniques known in the art such as sol-gel or vapor phase deposition could be used. In one specific example, the coating is between about 1 and 5 μm in thickness for a particle 108/320 that is between about 25 and 100 μm in diameter. In a more particle example, $MoSi_2$ particles 108/320 that are about 50 μm in diameter have an $SiO_2$ coating that is about 1 μm thick. In another particular example, $WSi_2$ particles that are about 75 μm in diameter have an $SiO_2$ coating that is about 2 μm thick Inclusion of such non-gas-evolving particles can reduce the total amount of gas evolved during reaction of gettering particles with oxidants, which can also assist in mitigating volume changes due to gas formation within the barrier layer as discussed above. Furthermore, the amount of gas buildup can be controlled by selecting specific amounts of non-gas-evolving gettering particles 108/320. More specifically, the amount of non-gas-evolving gettering particles 108/320 can be selected such that the expected amount of gas buildup in the barrier layer upon oxidation of the gettering particles 108/320 remains below the threshold of bubble formation.

In one example, the gettering particles 108/320 include at least one of porous particles 208/308/408 or non-gas-evolving particles as discussed above. That is, the gettering particles in the composite material 102 of the barrier layer and/or intermediate layer 316 can include any of porous particles 208/308/408, non-gas-evolving particles, silicon oxycarbide, and combinations thereof. The porous particles 208/308 and non-gas evolving particles could be in the barrier layer only, or in both the barrier layer and the intermediate layer 316. In a particular example, at least 30% of the gettering particles 108/208/308 in the barrier layer are porous particles such as particles 208/308/408. In another example, at least 30% of the gettering particles are non-gas-evolving particles. In another example, at least 30% of the gettering particles 108/320 in the barrier layer are a mixture of porous particles such as porous particles 208/308/408 and non-gas-evolving particles. In any of the foregoing examples, the balance of gettering particles 108/320 can be silicon oxycarbide particles. Including one or both of porous gettering particles 208/308/408 and non-gas-evolving gettering particles 108/320 can mitigate volume expansion of the barrier layer and associated mechanical disruptions as discussed above. This in turn can improve the longevity and effectiveness of the barrier layer as discussed above.

In a further example, the diffusive particles 110 can comprise a non-gas evolving material as discussed above.

In one example, the composite material 102 includes, by volume, 1-30% of the diffusive particles 110. In a more particular example, the composite material 102 includes, by volume, 1-10% of diffusive particles 110. In a further example, the composite material 102 includes, by volume, 30-94% of the gettering particles 108/320/208/308/408. In a particular example, the composite material includes, by volume, 60-90% of the gettering particles 108/320/208/308/408. In one further example, the composite material 102 includes, by volume, 5-40% of the matrix 106. In a further example, the composite material 102 includes, by volume, 1-30% of the diffusive/BMAS particles 110, 5-40% of the matrix 106, and a balance of the gettering particles 108/320/208/308/408.

In one example, an average maximum dimension of the BMAS particles 110 is less than the average maximum dimension of the gettering particles 108/320/208/308/408.

The barrier layer and/or intermediate layer 316 can be fabricated using a slurry coating method. The appropriate slurries can be prepared by mixing components, such as a porous hafnium silicide particle, silicon oxycarbide, barium-magnesium alumino-silicate, and powder of silicon dioxide or colloidal silica (Ludox) in a carrier fluid, such as water. The slurries can be mixed by agitation or ball milling and the resulting slurry can be painted, dipped, sprayed or otherwise deposited onto the underlying substrate 104. The slurry can then be dried at room temperature or at an elevated temperature to remove the carrier fluid. In one example, the slurry is dried and cured at about 200° C. for at least 15 minutes to ensure proper cross-linking of the coating. The green coating can then be sintered at an elevated temperature in air for a selected amount of time. In one example, the sintering includes heating at 1500° C. or greater in an air environment for at least 1 hour.

The composite material 102 for the barrier layer can be prepared using a slurry coating method. Slurries can be prepared by mixing components such as gettering particles 108/208/208/408/320, diffusive particles 110, and matrix 106 material such as $SiO_2$ or Ludox (a source colloidal $SiO_2$) in a carrier fluid such as and water using agitation or ball milling. Various slurry coating methods such as painting, dipping and spraying can be used to coat ceramic matrix composite (CMC) substrates. Coatings formed from slurry are dried at room temperature and cured at 200° C. for at least 15 minutes. This coating process can be repeated until all layers are coated. The barrier layer is finally sintered at 1500° C. in air for 1 hour.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:
1. An article comprising:
    a ceramic-based substrate; and
    a barrier layer on the ceramic-based substrate, the barrier layer including a matrix, diffusive particles, and gettering particles, wherein the gettering particles include non-gas-evolving particles, wherein the non-gas-evolving particles have a protective coating, and wherein the protective coating is operable to limit reactivity of the non-gas-evolving particles.

2. The article of claim 1, wherein the non-gas evolving particles comprise at least 30% of the gettering particles.

3. The article of claim 1, wherein the non-gas evolving particles include at least one of metallic particles, silicide particles, aluminide particles, boride particles, and a mixture thereof.

4. The article of claim 1, wherein the gettering particles further include porous particles, and wherein the porous particles include a shell surrounding a hollow core.

5. The article of claim 4, wherein the shell comprises a silicon- or boron-containing material that is reactive with oxygen or water.

6. The article of claim 1, wherein the gettering particles further include porous particles, and wherein the porous particles are an agglomerate of sub-particles.

7. The article of claim 6, wherein the sub-particles are hollow shells in a matrix.

8. The article of claim 1, wherein the gettering particles further include porous particles, and wherein the porosity of the porous particles is between about 30-70%.

9. The article of claim 1, wherein the diffusive particles are barium-magnesium alumino-silicate particles.

10. The article of claim 1, wherein the gettering particles include silicon oxycarbide particles.

11. The article of claim 1, further comprising a ceramic-based topcoat on the barrier layer.

12. The article of claim 1, further comprising an intermediate layer between the barrier layer and the substrate, wherein the intermediate layer comprises gettering particles in a matrix.

13. The article of claim 1, wherein the article is an airfoil, combustor wall or blade outer seal for a gas turbine engine.

14. The article of claim 1, wherein the coating of the non-gas-evolving particles is silica.

15. The article of claim 1, wherein the non-gas-evolving particles are $MoSi_2$ particles or $WSi_2$ particles.

16. An article, comprising:
    a ceramic-based substrate;
    a barrier layer on the ceramic-based substrate, the barrier layer including a matrix, barium-magnesium alumino-silicate particles, and gettering particles, wherein the gettering particles include non-gas-evolving particles, wherein the non-gas-evolving particles have a protective coating, and wherein the protective coating is operable to limit reactivity of the non-gas-evolving particles;
    an intermediate layer between the barrier layer and the ceramic-based substrate, the intermediate layer including gettering particles in a matrix; and
    a ceramic-based topcoat on in the barrier layer.

17. The article of claim 16, wherein the non-gas evolving particles comprise at least 30% of the gettering particles in the barrier layer.

18. The article of claim 16, wherein the non-gas evolving particles include at least one of metallic particles, silicide particles, aluminide particles, boride particles, and a mixture thereof.

19. The article of claim 16, wherein the gettering particles further include porous particles, and wherein the porous particles include a shell surrounding a hollow core.

20. The article of claim 16, wherein the gettering particles further include porous particles, and wherein the porous particles are an agglomerate of hollow sub-particles in a matrix.

* * * * *